United States Patent Office 3,524,711
Patented Aug. 18, 1970

3,524,711
HELICOPTER ROTORS
Ian Clifford Cheeseman, Camberley, James Eric George, Farnborough, and Charles Reginald Lawrence, Camberley, England, assignors to Minister of Technology in Her Britannic Majesty's Government of the United Kingdom of Great Britain and Northern Ireland, London, England
Filed May 13, 1968, Ser. No. 728,476
Claims priority, application Great Britain, May 12, 1967, 22,070/67
Int. Cl. B64c 27/18
U.S. Cl. 416—20
14 Claims

ABSTRACT OF THE DISCLOSURE

A helicopter rotor has variable incidence blades of elliptical cross-section on which lift may be induced by the discharge of air from spanwise extending slots. Air discharge is varied cyclically in accordance with rotation of the rotor whereby the pattern of blade lift across the rotor disc can be modified without cyclic changes in blade incidence. Two alternative mechanisms for varying the blade incidence are described, each of which simultaneously acts to vary airflow to the blade slots. Air is obtained from a compressor connected to the rotor drive so that it can function during autorotation of the rotor.

Two embodiments are described, differing in mechanism used to vary the blade incidence and which simultaneously acts to vary the total airflow passing to the blade slots.

Air is obtained from a compressor connected to the rotor drive so that it can function during autorotation of the rotor in order to provide cyclic control when engine power is not available.

---

This invention relates to helicopter rotors and more specifically to means for controlling the aerodynamic lift on helicopter rotor blades and its distribution relative to the swept disc of the rotor.

The circulation of a fluid around a body may be modified by the effect of other streams of fluid. In particular, the discharge of streams of air or other gas from apertures in the surface of a body can be arranged to modify the circulation round the body so as to induce or increase lift on the body.

British patent specifications Nos. 944,010, 948,947 and 956,013 relate to convertiplane-type aircraft which include helicopter rotors having blades of substantially circular cross-section rigidly attached to the rotor hub. Airflow over a circular cylinder normally produces little or no lift but by discharging streams of compressed air rearwardly from one or more shallow spanwise-extending apertures formed in the surface of each blade they can be made to act as lifting aerofoils. Cyclic and collective alterations in blade lift may be obtained by controlling the air discharge from the blade apertures.

British patent specifications Nos. 1,033,980, 1,066,223 and 1,073,418 disclose arrangements in which air discharged from blade apertures is varied by control mechanisms forming a part of the non-rotating structure of helicopter rotor hubs.

The combination of such control arrangements with circular section bladed rotors make for a less complicated rotor and hub assembly than has hitherto been the case in conventional helicopters in which lift variations are largely effected through movement of the blades. The rigid circular-section blades are of particular value in the case of a convertiplane where it is desirable to discontinue the drive to the rotor in cruising flight.

However, it is considered that features arising out of the aforesaid control mechanisms might be utilised with advantage to improve the performance of a helicopter-type aircraft, i.e., one deriving its lift from a rotor in all phases of flight.

Thus, the high lift coefficients obtainable by use of circulation control permit the use of blade sections which make a non-articulated rotor practicable and also facilitate reductions in the numbers of blades and in blade chord. The resultant reduction in profile power more than offsets the power required to produce the streams of air and makes higher forward speeds possible. Further speed improvement is obtainable through the use of multi-harmonic cyclic control such as is fairly readily available with a non-rotating valve assembly, for instance as disclosed in the specification of Pat. No. 1,066,223.

A helicopter rotor according to the invention has at least one variable incidence blade carried by a rotatable head member which is mounted on non-rotating structure, at least one aperture extending along the span of a blade and arranged to discharge a fluid stream over the blade surface so as to induce lift on the blade, means for leading fluid flow into the head member and for conducting fluid thence to the blade for discharge therefrom, means for varying blade incidence, and non-rotating control means for varying the momentum of the fluid stream.

According to a feature of the invention, means are provided for varying the fluid discharge cyclically according to rotation of the rotor to give lift variations without corresponding changes in blade incidence.

In another feature of the invention, changes in blade incidence are accompanied by a variation in the flow of fluid into the head member.

Embodiments of the invention will now be described by way of example with reference to the accompanying drawings of which.

Figure 1:
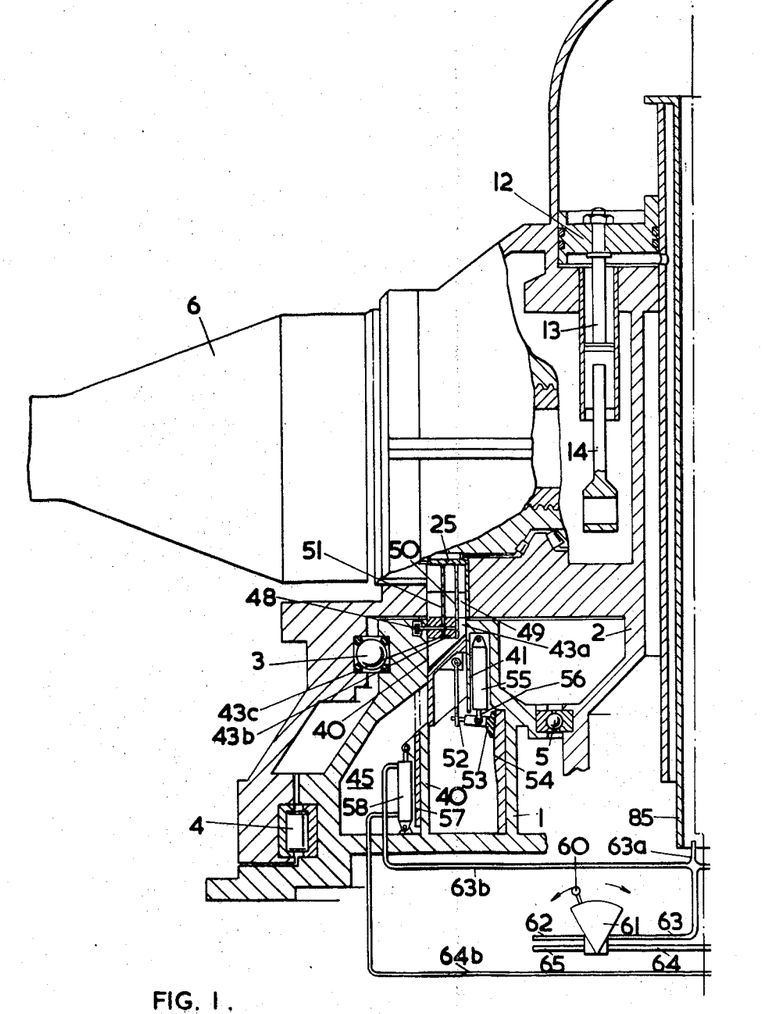
FIG. 1 is an axial sectional view of a helicopter rotor hub assembly.

FIG. 1 shows a helicopter rotor assembly comprising a generally annular housing 1 intended to be rigidly connected to the structure of an aircraft, a rotating hub member 2 carried on the annular housing by means of bearings, 3, 4, 5, and rotor blades 6. The blades are supported by the hub member 2 through two rows of taper roller bearings 7, 8 and by needle bearings 9 carried by a yoke member 10 which forms an extension of the hub member 2 and surrounds the blades at their root ends. A domed cylinder 11, mounted on the upper end of the rotating hub member 2 and co-axial with it, contains a piston 12 which is connected in each blade 6 by means of a rod 13 and an articulated link 14 through a pin 15 carried on the inner end of the root of the blade and displaced radially from the blade axis. Thus, movement of the piston 12 along the cylinder 11 will cause the blades to turn about their respective axes. Concentric tubes 80, 85 extend along the axis of the rotating hub member 2, and serve to conduct hydraulic fluid whereby the piston 12 may be caused to move along the cylinder 11. The outer tube 80 is provided with ports 90 opening into the cylinder 11 beneath the piston 12 while the inner tube 85 opens into the cylinder above the piston, the upper end of the outer tube 80 being blanked off.

The roots of the blades are circular in cross-section tapering down to the blade proper 6a which is elliptical in cross-section the chord being of the order of five times the depth (i.e., a 20 percent ellipse).

Figure 2:
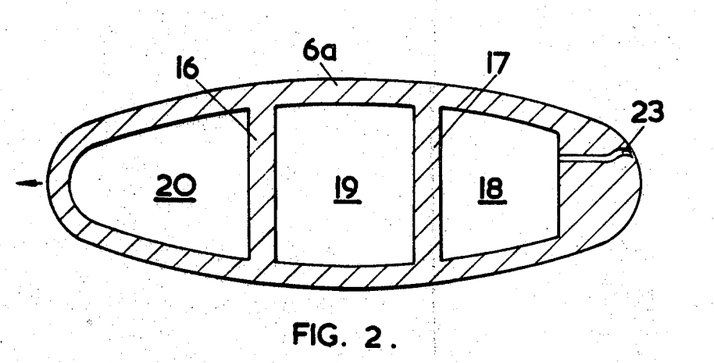
FIGS. 2, 3 and 4 are transverse sectional views of a helicopter rotor blade taken at different stations along the blade.
Figure 3:
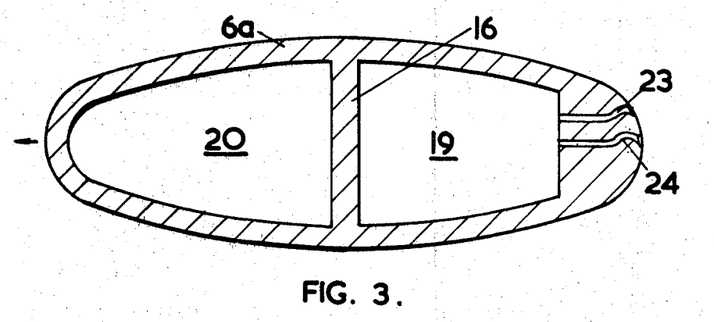
Figure 4:
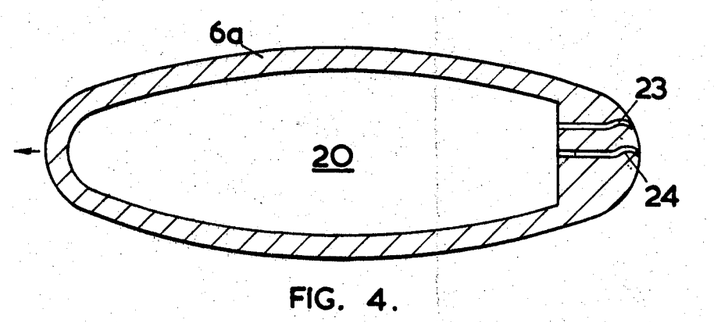
Figure 5:
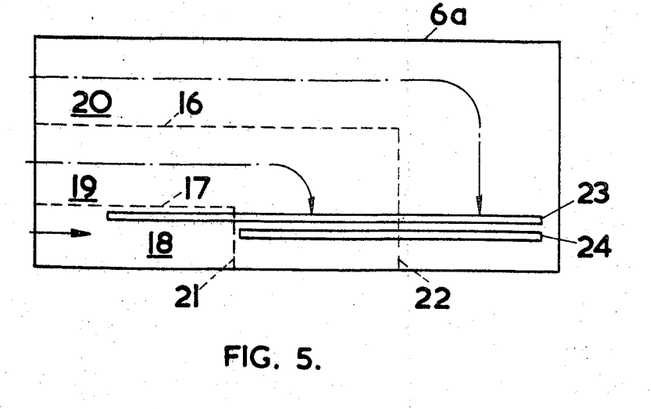
FIG. 5 is a diagrammatic representation of a helicopter rotor blade in plan.

Each blade is divided spanwise into inboard, mid-span, and outboard sections as shown diagrammatically in FIG. 5 in which the blade root is on the left and the blade tip at the right. In this figure (and also FIGS. 2, 3 and 4 as indicated hereafter), longitudinal partitions 16, 17 extending internally along the inboard section of the blade (FIG. 2) divide its hollow interior into three passages 18, 19, 20. Passages 19 and 20 extend into the mid-span section of the blade (FIG. 3), the passage 18 being closed off by a blanking plate, indicated by 21. Similarly, passage 19 is closed off by a blanking plate 22 leaving passage 20 alone to extend into the outboard section of the blade (FIG. 4).

Spanwise-extending apertures 23, 24 are formed in the surface of each blade near its trailing edge, the surface itself being extended over the apertures in the form of spring flaps which serve to close the apertures except as will appear later.

The aperture 23 extends over all the sections of the blade while the other 24 extends only over the mid-span and outboard sections. The portions of the apertures extending over the outboard section of the blade are connected to the passage 20, those positions extending over the mid-span section are connected to the passage 19 and the portion of aperture 23 extending over the inboard section is connected to the passage 18.

Figure 6:
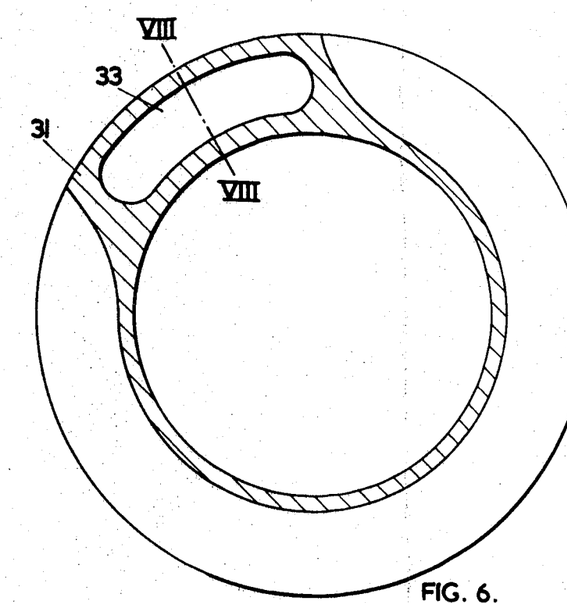
FIGS. 6 and 7 are transverse sectional views of a rotor blade component taken on the lines VI—VI and VII—VII respectively in FIG. 1.
Figure 7:
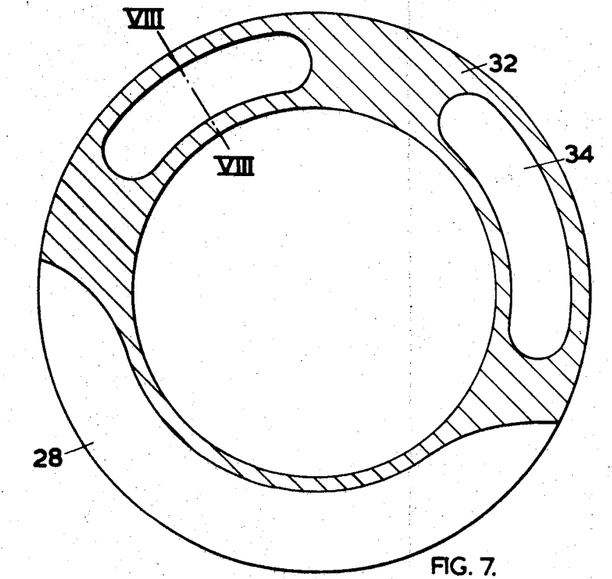
Figure 8:
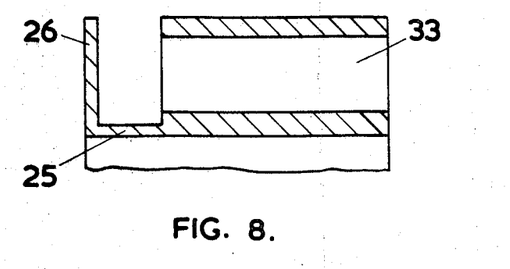
FIG. 8 is a longitudinal section of part of the component of the previous two drawings taken on the line VIII—VIII therein.

As shown in FIG. 1, the root of each blade carries an air distributor 25. This is in the form of a collar with sections machined away to form lands 26, 27, 28. Material is removed evenly between lands 26 and 27 to form an annular groove, or dwell, 29. A similar dwell 30 is formed between lands 27 and 28 but in this case only about two-thirds of the material is removed leaving an upstanding portion 31 (see FIG. 6). At the other side of land 28 material is removed from around less than half of the circumference of the collar leaving a larger upstanding portion 32 (see FIG. 7). The upstanding portion 31 is pierced by an arcuate slot 33 which also extends through the corresponding section of the portion 32 (see FIG. 8). Another arcuate slot 34 is pierced through that part of the upstanding portion 32 which has no counterpart in portion 31.

Figure 9:
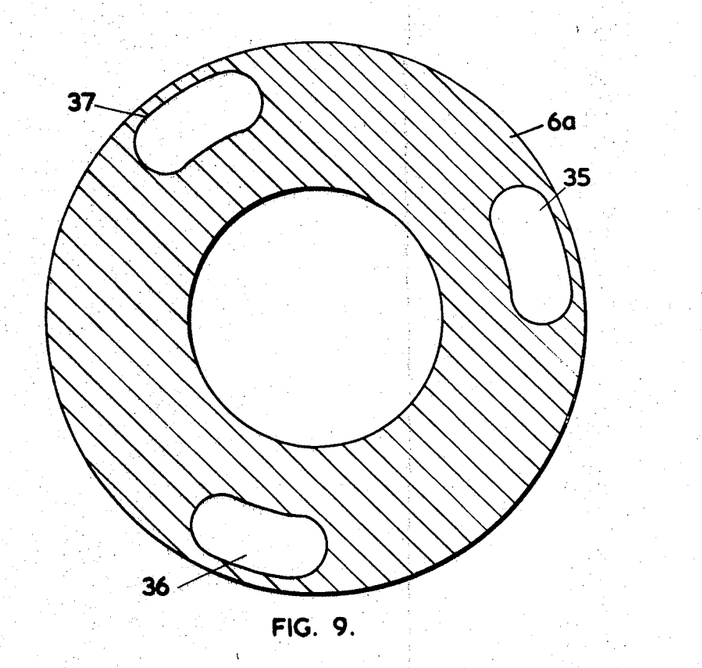
FIG. 9 is a transverse sectional view of another part of the helicopter rotor blade.

The inner portion of the blade root is of reduced diameter and the air distributor 25 is carried on this reduced portion abutting the face of the step between the two portions. The said face is provided with arcuate slots 35, 36, 37 (see FIG. 9) spaced circumferentially which communicate with the passages 18, 19, 20 respectively in the blade proper by means of passages extending through the blade root. One passage 39, connecting the slot 36 with the passage 19, is shown in FIG. 1. When the air distributor is correctly positioned, the slot 33 will be aligned with similar slot 37 in the face and slot 34 likewise with slot 35 while the slot 36 in the face will open on to a dwell 38 formed between the land 28 and the face. The passages 18, 19, 20 are thus each in communication with one of the dwells of the air distributor.

The circumferential extent of the slots 35, 36, 37 is less than the corresponding extent of their mating dwell or slot to allow for the relative movement resulting from changes in blade incidence.

Figure 10:
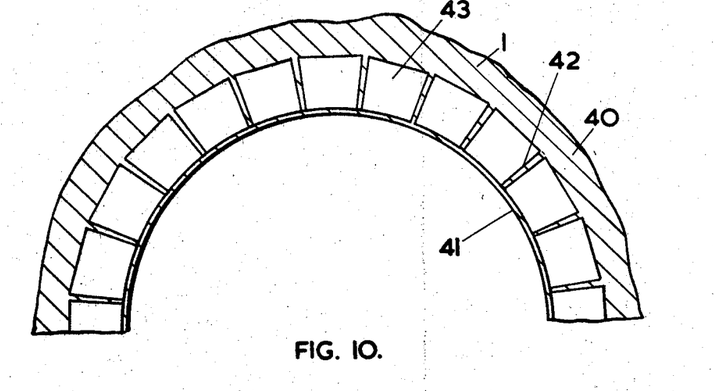
FIG. 10 is a half-sectional view through the rotor hub assembly taken on the line X—X in FIG. 1.

The housing 1 contains an annular valve assembly disposed co-axially with the rotor axis. As may be seen from FIG. 10 two concentric walls 40, 41 have a series of circumferentially-spaced radial partitions 42 extending between them to form segmental ports 43. In each segmental port is a valve member 44 slidable up and down to close or open the port, as shown at the right- and left-hand sides respectively of FIG. 1. Entry to the ports is provided by an annular inlet extending circumferentially of the wall 40 and communicating with an annular plenum chamber 45. The valves 44 are arranged to ride over this inlet so that movement of any valve from the open to the closed position gives a progressive throttling. The plenum chamber is connected to a suitable air supply source such as the compressor of a gas turbine power plant.

The outlet from each of the ports 43 is divided into three channels 43a, b and c by circumferential splitter plates 46 extending between adjacent radial partitions 42. Throttle valves 47 are provided in the channels 43b and 43c in each port on a common spindle extending through the outer wall of the valve assembly and terminating in a toothed gear wheel 48 serving to transmit movements to the valves from control means as will be described later. The outlets from the ports 43 are aligned with transfer ports 49 formed in each blade each having an entry of segmental shape which rides progressively over the valve assembly. The transfer ports are divided by baffles 50, 51 which are aligned with the splitter plates and respectively with the lands 27, 28 of the air distributor 25.

Each of the slide valves 44 is connected by a link 52 to the periphery of a gimbal ring 53 carried on a part spherical bearing 54 mounted co-axially with the rotor. A hydraulic jack 55 attached to the casing 1 is connected to the gimbal ring by actuating rod 56 and, with another jack (not shown) similarly connected and set 90° apart round the periphery of the gimbal ring, may be operated to tilt the gimbal ring thus causing differential movement of the slide valves. The areas of the entries to the ports 43 from the plenum chamber 45 may be simultaneously varied by axial movement of a sleeve valve 57 (as indicated in dotted lines) operated by the simultaneous operation of a pair of diametrically-opposed hydraulic jacks 58, 59.

Compressed air supplied to the plenum chamber 45 and passing into the ports 43 will be directed by the splitter plates in the port outlets and the baffles in the transfer ports to separate dwells in the air distributor and so to separate sections of the blades. The pressure of the air acting on the spring flaps closing the blade apertures causes these to lift and direct the air as thin layers tangentially over the surfaces of the rearward parts of the blades thereby modifying the circulation around the blades and inducing aerodynamic lift.

Tilting the gimbal ring gives a variation in valve opening circumferentially around the valve assembly. The amount of air passing through the blade transfer ports (which receive air from the port outlets according to the relative positions of the blades), and hence the relative momentum of the streams, is thus varied in an appropriately-phased relationship to the rotation of the rotor. Generally it is desired to discharge more air from the apertures of a retreating blade than from those of an advancing blade.

The overall effect is equivalent to the cyclic blade incidence changes (cyclic pitch control) in a conventional helicopter. The phase relationship between blade lift and rotor control can also be varied to effect roll and pitch control by varying the plane of inclination of the gimbal ring.

Movement of the sleeve valve 57 will vary the total airflow passing to the blade apertures by which means the momenta of the air streams discharged from the apertures in all blades will be varied in the same sense to increase or decrease the total blade lift in similar fashion to conventional helicopter collecitve pitch control.

In operation, the rotor blades are adjusted to an optimum incidence setting appropriate to the desired flight condition by applying hydraulic pressure above or below the piston 12 through the medium of the concentric tubes 80, 85. The necessary cyclic and control lift variations are henceforward applied by varying the momenta of the air streams discharged from the apertures in the blades, the blade incidence angle remaining unchanged until a new phase of operation is required.

In general, an increase in blade incidence requires less mass airflow and vice versa, thus it is desirable that changes in blade angle be accompanied by movement of the sleeve valve 57. This can be arranged by linking the hydraulic jacks 58, 59 to the hydraulic circuit operating the incidence changing mechanism. Such an arrangement is shown diagrammatically in FIG. 1; movement of a control lever 60 through the medium of valves contained in a control box 61 will connect a fluid pressure line 62 with one of two feed lines 63, 64 at the same time connecting the other to a return line 65. If it is desired to increase blade incidence, the lever is moved to the right connecting the pressure line to the feed line 63 whereby hydraulic pressure is applied to the underside of the piston 12 via the tube 80 and branch line 63a. At the same time pressure is applied to the hydraulic jacks 58, 59 via branch lines 63b, 63c to cause upward movement of the sleeve valve 57 and restrict the mass flow from the plenum chamber 45. Movement of the control lever in the opposite direction results in fluid pressure being applied to the upper surface of the piston 12 via tube 85 and branch line 64a and to the jacks 58, 59 via branch lines 64b and 64c thus reducing blade incidence and increasing the mass airflow.

It is envisaged that the incidence change mechanism might alternatively be operated electrically in known conventional manner and that the jacks operating the sleeve valve 57 might be replaced by other types of actuator, e.g., electric or compressed air. Whatever combination is used, the interconnection of the incidence change mechanism and the actuators should present no practical difficulty. It is however, intended that the actuators (and the slide valve) should be capable of at least a limited range of movement independently of the incidence change mechanism.

When a helicopter goes into forward flight, the relative airflow over the inboard end of the blade becomes negative and this region of the negative flow increases with increase in forward speed. One result of this is a loss of lift over the inboard and mid-span sections of the blade which cannot be counteracted by any practicable increase in the momenta of the air streams discharged from the apertures in the blades in those sections. It is desirable that the air flow of these sections of the blades be discontinued or reduced under these conditions and this is achieved by rotating the gear wheels 48 attached to the throttle valves 47 to restrict or close the channels 43a, 43b in the affected sector. The extent to which this is done is dependent primarily on the forward speed of the aircraft and may conveniently be effected by pressure responsive means linked to the pitot system of the aircraft air speed indicator. In general this will only be applicable to those channels in the valve ports located in the 180° sector swept by a retreating blade. However, the valves in the remaining channels may be used to vary the airflow to the blades so as to reduce vibrations resulting from fluctuations in lift over the rotor disc.

In a modification of the invention, advantage is taken of the high relative air velocity in the reverse flow region by reversing the direction of air discharge from the blade. Since the blade is of an elliptical section this presents no difficulties so far as lift generation is concerned particularly at the blade incidence angles applicable to forward flight.

Figure 11:
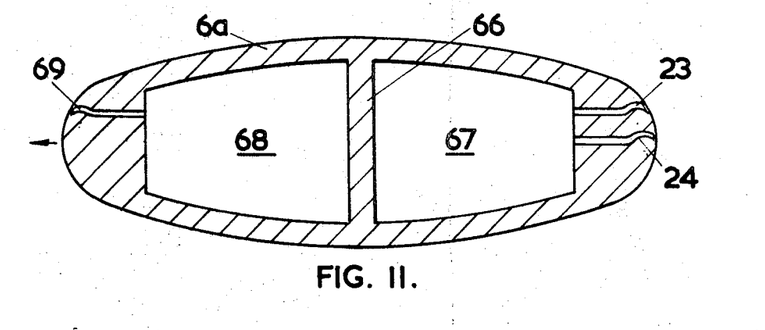
FIG. 11 is a transverse sectional view of another helicopter rotor blade.

The blade 6a in FIG. 11, or an appropriate section of it, is divided internally by a longitudinal partition 66 into two passages 67, 68. Blowing apertures 23, 24 are formed in the rear surface of the blade as previously and connected to the passage 67. A forward-facing aperture 69 of similar construction is provided in the surface of the blade near its leading edge and connected to the passage 68. By a suitable arrangement of blade passages air distributor channels, transfer port baffles and throttle valves in the outlets of the ports 43 it can be arranged that air is supplied to either of the channels 67, 68 as required so that air is discharged from the apertures 23, 24 or the aperture 69 according to prevailing conditions. If desired, two or more apertures may be provided in the forward part of the blade.

Figure 12:
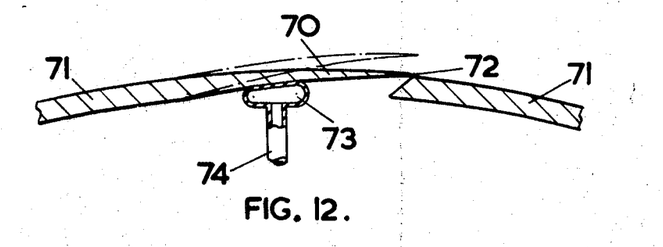
FIG. 12 is a sectional view of part of a helicopter rotor blade.

It is possible that the pressure of the air supplied to the apertures in the blades for discharge therefrom might be insufficient to open the spring flaps, or to open them enough to permit discharge of adequate volumes of air. Since it is desirable for aerodynamic reasons that the apertures remain closed except when actually in use, some other means of opening them will be required. One method whereby this may be achieved is shown in FIG. 12 in which a spring flap 70 formed in the surface 71 of an aerofoil rests on a lip 72 also forming part of the said surface which is substantially contiguous. An air sac 73 bears on the undersurface of the spring flap and is connected via pipeline 74 to a suitable source of air pressure. When air is admitted to the sac it will expand and move the spring flap upwardly away from the lip 72 thus forming an aperture. On release of the air pressure, the spring flap will act to close the aperture again. A convenient method of operation would be to connect the pipeline 74 to the passage supplying air for discharge from the aperture.

Figure 13:
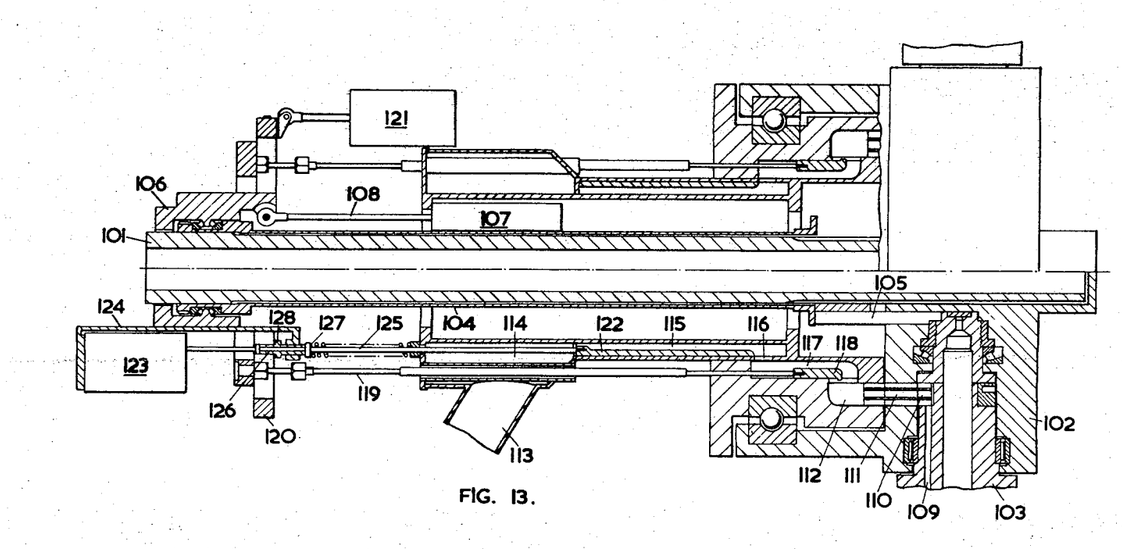
FIG. 13 is an axial sectional view of another helicopter rotor hub assembly.

FIG. 13 shows an alternative rotor hub assembly to that of FIG. 1. Although structurally different it operates in much the same way. A rotating drive shaft 101 carries sockets 102 which support blade root members 103. A sleeve 104 surrounds the drive shaft and is movable axially. A bracket at the upper end of the sleeve is connected to a radial arm attached to the blade root member 103 by means of a link rod 105 so that movement of the sleeve will cause rotation of the blade root member and the blade (not shown) attached to it about its axis. Movement of the sleeve is effected by means of a yoke 106 which is connected to an actuator 107 through a link 108. The rotor blades themselves are similar to those previously described being of elliptical section and subdivided by internal partitions into separate spanwise sections connected to separate passages formed in the blade root member (one, 109, being shown) and thence by means of an air distributor 110 and a transfer port 111 to the outlets of an annular array of non-rotating segmental ports as before. The blades are also provided with spanwise-extending apertures from which air may be discharged for purposes of circulation control. The outlets from the ports 112 are divided into three channels by splitter plates and the throttle valves provided in the channels again as in the previous example.

Compressed air is led by a duct 113 to a plenum chamber 114 and thence along an annular passage 115 through entries 116 into an annular series of valve chambers 117 before passing into the ports 112. Slide valves 118 are provided in each valve chamber and serve to throttle the air passing therethrough. Each valve is connected by a link rod 119 to a gimbal ring 120. Actuators 121 (of which one is shown) are pivotally connected to the gimbal ring at circumferential points located 90° apart by which means the gimbal ring may be tilted to give differential adjustment of the slide valves for cyclic control purposes. A sleeve 122 located in the annular passage 115 may be moved axially to vary the areas of the entries 116 to the valve chambers simultaneously. An actuator 123 carried on a bracket 124 attached to the yoke 106 so as to move with it operates the sleeve by means of a push rod 125 and a splined coupling 126 serving as an interlock between the sleeve 122 and the incidence changing sleeve 104. By this means the air supply to the blades is reduced when the incidence angle is increased and vice versa, collars 127, 128 on the push rod being arranged to engage stops on the bracket 124 to ensure that movement of the sleeve 122 does not exceed the limits imposed by a particular incidence angle.

The construction last described may be used in conjunction with the arrangement disclosed in the specification of British Pat. No. 1,066,223 wherein the slide valves may be adjusted independently of the movement of the gimbal ring by varying the effective lengths of their associated link rods.

In both constructions it will be appreciated that, in the event of an engine failure, a serious loss of lift or control might occur if the air supply to the blades was supplied entirely from the compressor of a gas turbine engine driving the rotor. In one proposed arrangement the engine is connected to the rotor through a free wheel (or slip coupling) and a gear box, a drive to a separate compressor being taken off between the free wheel and the gear box. In the event of an engine failure, the blade incidence may be set to give auto-rotation of the rotor which will drive the compressor through the gear box by which the rotational speed is stepped up in the process.

In alternative constructions the arrangement of the apertures may be varied, for instance in that both apertures in the rear of the blade might extend over the entire blade span or there might be only one aperture in each blade which might not extend over the entire span. Similarly the number of spanwise divisions might be reduced to two or increased dependent on circumstances.

Furthermore, the blade section, while remaining substantially elliptical, might vary along the blade (say from 20 percent to 10 percent towards the tip) and the blade might taper in plan. A cambered blade having a concave undersurface can also be envisaged.

Again, the apertures in the blade may be constituted by a series of short slots or rows of closely spaced holes rather than being continuous along the span as shown in FIG. 5.

We claim:
1. A helicopter rotor comprising at least one variable incidence blade of substantially elliptical cross-section mounted for rotation about its axis in a head member rotatably mounted on non-rotating structure, at least one aperture extending along the span of the blade in the upper surface thereof and adjacent to the trailing edge of the blade, means for leading fluid into the head member, and for conducting fluid thence to the blade for discharge from apertures therein, each aperture being shaped and arranged to discharge a fluid stream substantially tangentially over the trailing edge of the blade, means for varying blade incidence, and non-rotating control means for varying the momentum of the fluid stream.

2. A helicopter rotor according to claim 1 further comprising means for varying the fluid discharge according to the rotation of the rotor to give cyclic lift variations over the rotor disc without change of blade incidence.

3. A helicopter rotor according to claim 2 wherein the means for varying blade incidence acts to vary fluid flow into the head member.

4. A helicopter rotor according to claim 2 wherein the non-rotating control means comprises an annular valve assembly mounted co-axially relative to said head member and having a plurality of axially-extending passages for fluid flowing to the head member, and a valve slidably mounted in each of said passages to vary flow therethrough.

5. A helicopter rotor according to claim 4 wherein the valves are capable of movement differentially of each other.

6. A helicopter rotor according to claim 4 wherein the passages are in communication with a common fluid supply and a further valve is provided to vary the fluid supply and operatively connected to the means for varying blade incidence.

7. A helicopter rotor according to claim 2 having at least one pair of opposed blades, and means movable along the axis of the rotor connected to turn the blades about their respective axes.

8. A helicopter rotor according to claim 7 wherein the means movable along the axis of the rotor is connected to vary fluid flow into the head member.

9. A helicopter rotor according to claim 7 wherein the means movable along the axis of the rotor comprises a piston actuated by fluid pressure.

10. A helicopter rotor according to claim 9 wherein fluid pressure for piston actuation is also connected to means operating a valve which acts to vary fluid flow into the head member.

11. A helicopter rotor according to claim 8 wherein the means movable along the axis of the rotor is a sleeve member operated by an actuator and connected to a valve which acts to vary fluid flow into the head member.

12. A helicopter rotor according to claim 1 further comprising at least one aperture extending along the span of a blade in the upper surface thereof and adjacent to the leading edge of the blade, each such aperture being shaped and arranged to discharge a fluid stream substantially tangentially over the leading edge of the blade, passages within the blade connected to supply fluid separately to the leading and trailing edge apertures for discharge therefrom, and means for selectively supplying fluid to the passages.

13. A helicopter rotor according to claim 3 having spring flaps arranged to close the apertures in the blades.

14. A helicopter rotor according to claim 13 wherein pressure operated means are provided to open the apertures.

References Cited

UNITED STATES PATENTS

| | | | |
|---|---|---|---|
| 2,556,710 | 6/1951 | Stalker | 170—135.4 |
| 2,650,666 | 9/1953 | Dorand et al. | 170—135.4 |
| 2,925,129 | 2/1960 | Yuan et al. | 170—135.4 |
| 3,096,041 | 7/1963 | Cheeseman et al. | 170—135.4 X |
| 3,139,936 | 7/1964 | Davidson et al. | 170—135.4 X |
| 3,211,397 | 10/1965 | Laing et al. | 170—135.4 X |
| 3,349,853 | 10/1967 | Flint | 170—135.4 |

FOREIGN PATENTS

| | | |
|---|---|---|
| 1,118,612 | 11/1961 | Germany. |
| 1,130,298 | 5/1962 | Germany. |

EVERETTE A. POWELL, Jr., Primary Examiner

U.S. Cl. X.R.

416—90